United States Patent
Frank et al.

(10) Patent No.: US 7,234,495 B2
(45) Date of Patent: Jun. 26, 2007

(54) UNDERGROUND MINE TIRE

(75) Inventors: Maurice Jacob Frank, Akron, OH (US); Steven Michael Wilton, Van Buren, AR (US); Lance Reed Wilkinson, Mogadore, OH (US); Brian Ernest McMahon, Akron, OH (US); Nicholas Lynn Sticklen, Winfield, WV (US)

(73) Assignee: The Goodyear Tire & Rubber Company, Akron, OH (US)

( * ) Notice: Subject to any disclaimer, the term of this patent is extended or adjusted under 35 U.S.C. 154(b) by 163 days.

(21) Appl. No.: 11/101,085

(22) Filed: Apr. 6, 2005

(65) Prior Publication Data

US 2006/0124217 A1    Jun. 15, 2006

Related U.S. Application Data

(60) Provisional application No. 60/636,269, filed on Dec. 15, 2004.

(51) Int. Cl.
*B60C 17/00*    (2006.01)
*B60C 3/04*    (2006.01)
*B60C 3/00*    (2006.01)
*B60C 9/20*    (2006.01)
*B60C 15/00*    (2006.01)

(52) U.S. Cl. ............ 152/157; 152/209.13; 152/209.18; 152/310; 152/454; 152/526; 152/540; 152/554

(58) Field of Classification Search ................ 152/157, 152/209.13, 209.18, 310, 454, 526, 527, 152/540, 554, 556
See application file for complete search history.

(56) References Cited

U.S. PATENT DOCUMENTS

| | | | |
|---|---|---|---|
| 3,703,203 A * | 11/1972 | Simpson | ...................... 152/554 |
| 3,999,907 A | 12/1976 | Pappas | |
| 4,436,127 A | 3/1984 | Balbis et al. | |
| 4,890,684 A | 1/1990 | Simmons | |
| 6,352,320 B1 | 3/2002 | Bonko et al. | |
| D457,487 S | 5/2002 | Rayman | |
| 6,405,774 B1 * | 6/2002 | Komatsu | ...................... 152/556 |
| 6,491,076 B1 | 12/2002 | Colantonio et al. | |
| 6,619,357 B1 | 9/2003 | Gillard et al. | |
| 6,623,580 B2 | 9/2003 | McMahon et al. | |
| 2004/0007303 A1 * | 1/2004 | Fishman | ...................... 152/454 |

* cited by examiner

Primary Examiner—Adrienne C. Johnstone
(74) Attorney, Agent, or Firm—David L. King

(57) ABSTRACT

An underground mine tire 20 having a nominal bead diameter of 20.0 inches or less has a carcass, a tread 25 and a pair of rubber sidewalls 23, each extending along the outer periphery of the carcass 21 below the tread 25. The tire 20 has a nominal bead width D greater than 8.50 inches and an overall diameter of less than 55 inches. The carcass 21 has at least one radial steel cord reinforced ply 24.

17 Claims, 6 Drawing Sheets

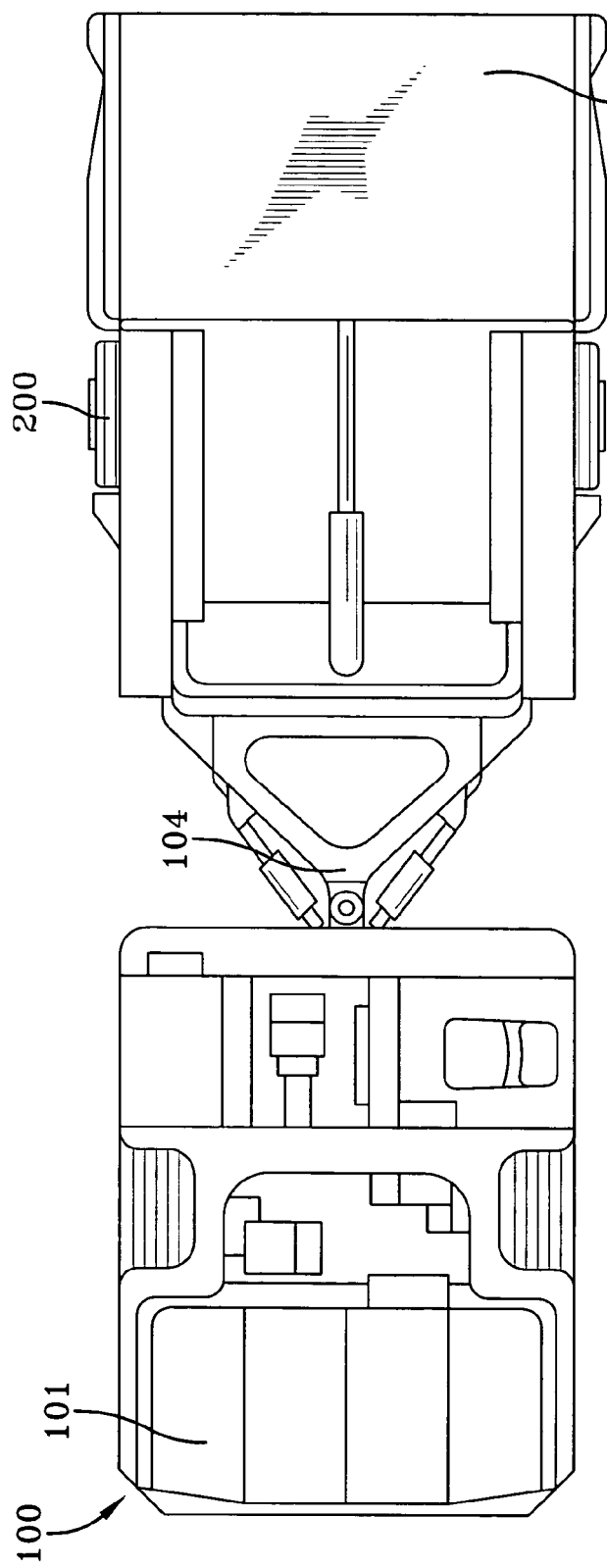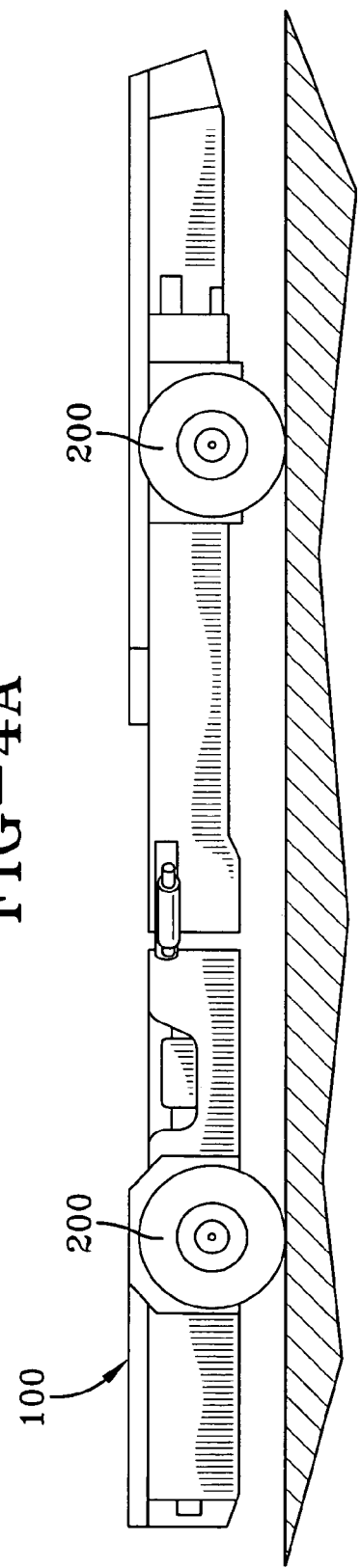
FIG-4A
FIG-4B

UNDERGROUND MINE TIRE

CROSS REFERENCE TO RELATED PATENT APPLICATIONS

This application claims the benefit of priority to provisional application Ser. No. 60/636,269 filed on Dec. 15, 2004 entitled "Underground Mine Tire".

TECHNICAL FIELD

This invention relates to heavy duty off the road tires, more particularly to underground mine tires.

BACKGROUND OF THE INVENTION

Underground mining for ore or coal is a highly mechanized industry involving specialized equipment to cut through rock and coal deposits to yield a harvest of ore or coal. This use of vehicles to haul the mined material has evolved to where large heavy loads of material are moved on vehicles that must travel within the cut seams hauling material out. Many of these seams are limited in height to less than 2 meters (6 feet), typically 5 feet (60 inches) or less and can run several miles in length. Mining operations make money by quickly moving tonnage of material. The more material that can be moved the more profitable the operation can be.

To haul material from a mine, vehicles as described in U.S. Pat. No. 4,890,684 are used. These vehicles are wide and low permitting them to travel within the seams. FIGS. 4A and 4B show a representative view of an exemplary articulated vehicle. As can be readily seen the tires have a diameter almost equal to the vehicle height. The carrying load capacity combined with the size of the tires dictates the amount of ore that can be carried in the bucket or trailer. The ore is typically filled to a point just clearing the ceiling of the cut seam. To carry more ore one can add more axles and add tires as is commonly seen in large commercial dump trucks.

Historically in above ground vehicles like commercial trucks, dual wheeled axles were used to increase loads. In off-road mining the tires increased in overall diameter. For the very large carrying capacity these tires are in excess of 120 inches (10 feet) in diameter. The use of dual or multiple tires on the axles of underground vehicles has not been an accepted practice for a variety of reasons. Similarly the use of large diameter tires has not been accepted because as the tire's sidewalls are increased, the entire vehicle is elevated due to the taller, larger outside diameters, these larger OD tires when used in the seam reduce the amount of ore that can be piled on the vehicle.

Ideally very small wheels would be used to haul ore. In early mining steel rails would be laid on the mine floor to enable buckets to be moved on small steel wheels. While this yielded big carrying capacity it increased cost and labor. In today's modern mines the equipment can cut seams so fast that the use of such rails is cost prohibitive. Accordingly, underground mining relies heavily on the tire preferably foam filled or solid filled or pneumatic as the most efficient structure to carry the heavy loads.

In order to increase the durability of such tires a massively thick tread and sidewall is employed. These tires operate at relatively low speeds and thus thick rugged cut resistant tires are permissible without a major concern over heat build up caused by hystoresis.

The overall load carrying capacity is limited by the overall strength of the carcass. In a radial ply tire the carcass has generally one or more radial steel cord reinforced rubber coated plies anchored or wrapped around a pair of bead structures and has a belt structure including typically at least 2 preferably more steel cord reinforced belt layers. Bias tires have many carcass plies/layers oriented at opposing angles of 35° to 65° relative to the equatorial center plane of the tire generally and a breaker structure of several layers of inclined cord reinforced layers.

The present invention provides a solution to the problem of increasing the overall load carrying capacity of underground mine tires without requiring an increase in the outer diameter size of the tire.

The present invention is adapted to be used with currently available mining equipment without requiring any modifications to the vehicle.

The present invention permits a more efficient use of the tire and improves the overall durability and serviceability of the tire.

SUMMARY OF THE INVENTION

An underground mine tire having a nominal bead diameter of 20.0 inches or less has a carcass, a tread and a pair of rubber sidewalls, each extending along the outer periphery of the carcass below the tread. The tire has a nominal bead width greater than 8.50 inches and an overall diameter of less than 55 inches. The carcass has at least one radial steel cord reinforced ply. The steel cord of the ply has a 0.04 inch diameter or greater.

One embodiment of the tire is of a 46×18 R20 size. The tire's carcass has a pair of annular bead cores. The bead cores have a cross sectional area of 0.36 sq inches or greater, employing a steel wire filament of 0.072 inches wrapped 64 turns or more and shaped in a hexagonal shape.

The carcass ply is wrapped about or around the bead cores and has a turnup end located between 40% and 60% of the section height of the tire.

The tire has a belt reinforcing structure having a radially inner first layer, a second layer, a third layer and a radially outer fourth layer. The first, second and third layers have cords with a cord diameter of 0.06 inches or greater in cords spaced at 8 ends per inch or less and the radially outermost fourth layer has cords having a cord diameter of 0.04 or less in cords spaced at 12 ends per inch or more.

The tire has a tread thickness Tt of 0.75 inches or greater and an overall carcass and sidewall minimum gauge thickness St of greater then 1.5 inches located in the proximity of the maximum section width near the ply turnup end. The preferred embodiment tire has a tread thickness greater than 2.0 inches.

Definitions

"aspect ratio" means the ratio of the tire's section height to its section width;

"axial" and "axially" refer to directions which are parallel to the axis of rotation of a tire;

"bead" refers to that part of a tire comprising an annular tensile member, the bead core, wrapped by ply cords and shaped, with or without other reinforcement elements to fit a designed tire rim;

"belt ply" refers to an annular layer or ply of parallel cords, woven or unwoven, underlying the tread, not anchored to the bead, and having cord angles of from 0.degree. to 80.degree. with respect to the EP of the tire;

"bias ply tire" means that the reinforcing cords in the carcass ply extend diagonally across the tire bead to bead at about an angle of 25-65 degrees with respect to the equatorial plane of the tire, the ply cords running at opposite angles in alternate layers.

"belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire;

"carcass" refers to the tire structure apart from the belt structure, tread, undertread, and sidewall rubber but including the beads, (carcass plies are wrapped around the beads);

"chafers" refers to narrow strips of material placed around the outside of the bead to protect cord plies from the rim, distribute flexing above the rim, and to seal the tire;

"chippers" mean a reinforcement structure located in the bead portion of the tire;

"circumferential" refers to lines or directions extending along the perimeter of the surface of the annular tread perpendicular to the axial direction;

"cord" means one of the reinforcement strands of which the plies in the tire are comprised;

"crown" refers to substantially the outer circumference of a tire where the tread is disposed;

"equatorial plane (EP)" refers to a plane that is perpendicular to the axis of rotation of a tire and passes through the center of the tire's tread;

"footprint" refers to the contact patch or area of contact of the tire tread with a flat surface at zero speed and under normal load and pressure or under specified load, pressure and speed conditions;

"innerliner" means the layer or layers of elastomer or other material that form the inside surface of a tubeless tire and that contain the inflating fluid within the tire;

"net-to-gross ratio" means the ratio of the tire tread rubber that makes contact with the road surface while in the footprint, divided by the area of the tread in the footprint, including non-contacting portions such as grooves;

"nominal rim diameter" means the average diameter of the rim flange at the location where the bead portion of the tire seats;

"normal inflation pressure" refers to the specific design inflation pressure and load assigned by the appropriate standards organization for the service condition for the tire;

"normal load" refers to the specific design inflation pressure and load assigned by the appropriate standards organization for the service condition for the tire;

"ply" means a continuous layer of rubber coated parallel cords;

"radial" and "radially" refer to directions that are perpendicular to the axis of rotation of a tire;

"radial-ply tire" means a belted or circumferentially-restricted pneumatic tire in which the ply cords which extend from bead to bead are laid at cord angles between 65 degree and 90 degree with respect to the equatorial plane of the tire;

"section height" means the radial distance from the nominal rim diameter to the outer diameter of the tire at its equatorial plane;

"section width" means the maximum linear distance parallel to the axis of the tire and between the exterior of its sidewalls when and after it has been inflated at normal inflation pressure for 24 hours, but unloaded, excluding elevations of the sidewalls due to labeling, decoration or protective bands;

"spliced belt ply" refers to a ply that has the lateral sides extending across the whole lateral width of the belt, the circumferential ends being spliced and overlapping, forming a lap-splice or a butt-splice;

"tread width (TW)" means the arc length of the tread surface in the axial direction, that is, in a plane passing through the axis of rotation of the tire.

BRIEF DESCRIPTION OF THE DRAWINGS

The invention will be described by way of example and with reference to the accompanying drawings in which:

FIGS. 4A and 4B are top and side views of an exemplary articulated vehicle for use in an underground mine;

DETAILED DESCRIPTION OF THE INVENTION

Figure 1:
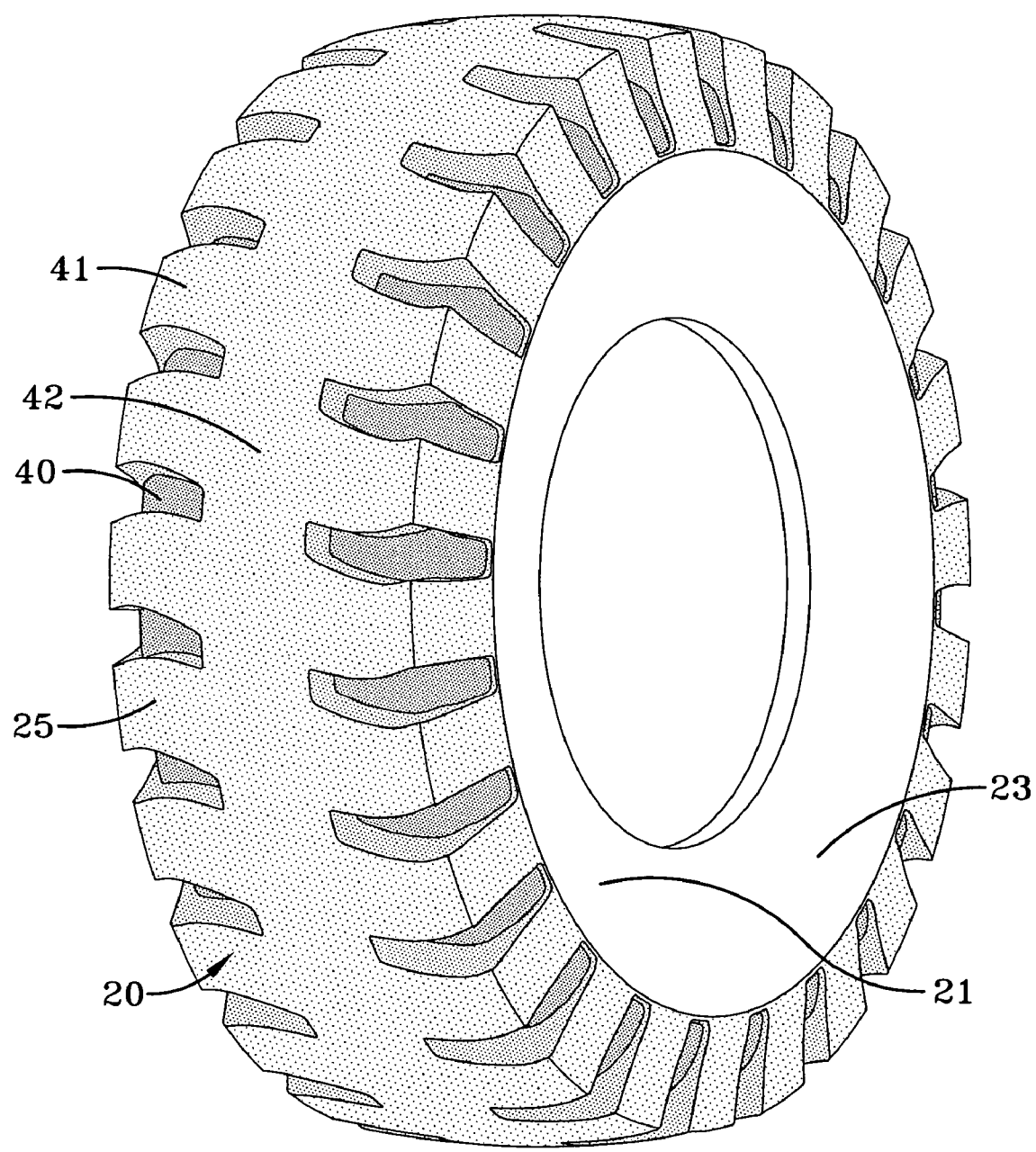
FIG. 1 is a perspective view of a tire according to the present invention.

With reference to FIGS. 4A and 4B an exemplary underground articulated vehicle 100 is illustrated. As shown the vehicle has a very low profile to enable it to traverse through the cut seams of an underground mine. The articulated vehicle 100 as illustrated has a battery or diesel powered forward section 101 and an ore carrying aft section 102 coupled to the forward section 101 by a hinged joint 104. As shown the vehicle has four tires 200, two tires on the forward section and two tires on the aft section.

As discussed the outside diameter of the tires 200 of this exemplary vehicle is substantially the same height as the vehicle. Accordingly to increase the tire's load carrying capacity by increasing the overall diameter of the tire would mean that the vehicle would be elevated by the movement of the axle upward. This would inherently bring the bed of the aft portion closer to the top of the seam which would reduce the volume of ore material that can be loaded. Secondarily, the raising of the vehicle platform would mean the cut seam would have to have a minimum height greater than at least the overall diameter of the tires.

In order to keep the tires overall size to a minimum it is preferred to use rims having nominal rim diameters of 25 inches or less. For mines having a cut seam height of 5 feet (60 inches) or less preferably the nominal rim diameter is restricted to 20 inches or less.

Figure 5:
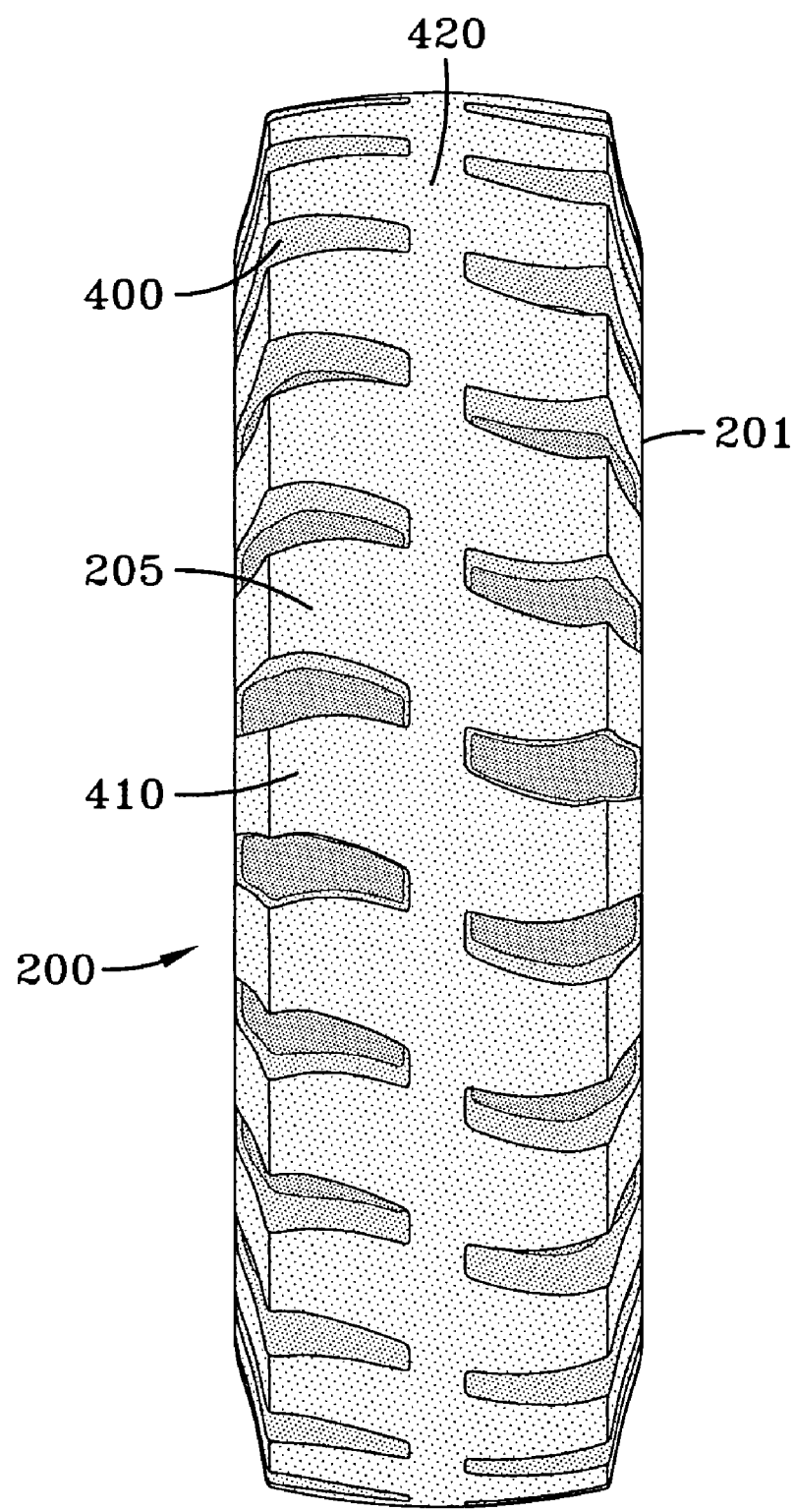
FIG. 5 is a perspective view of a prior art tire.
Figure 6:
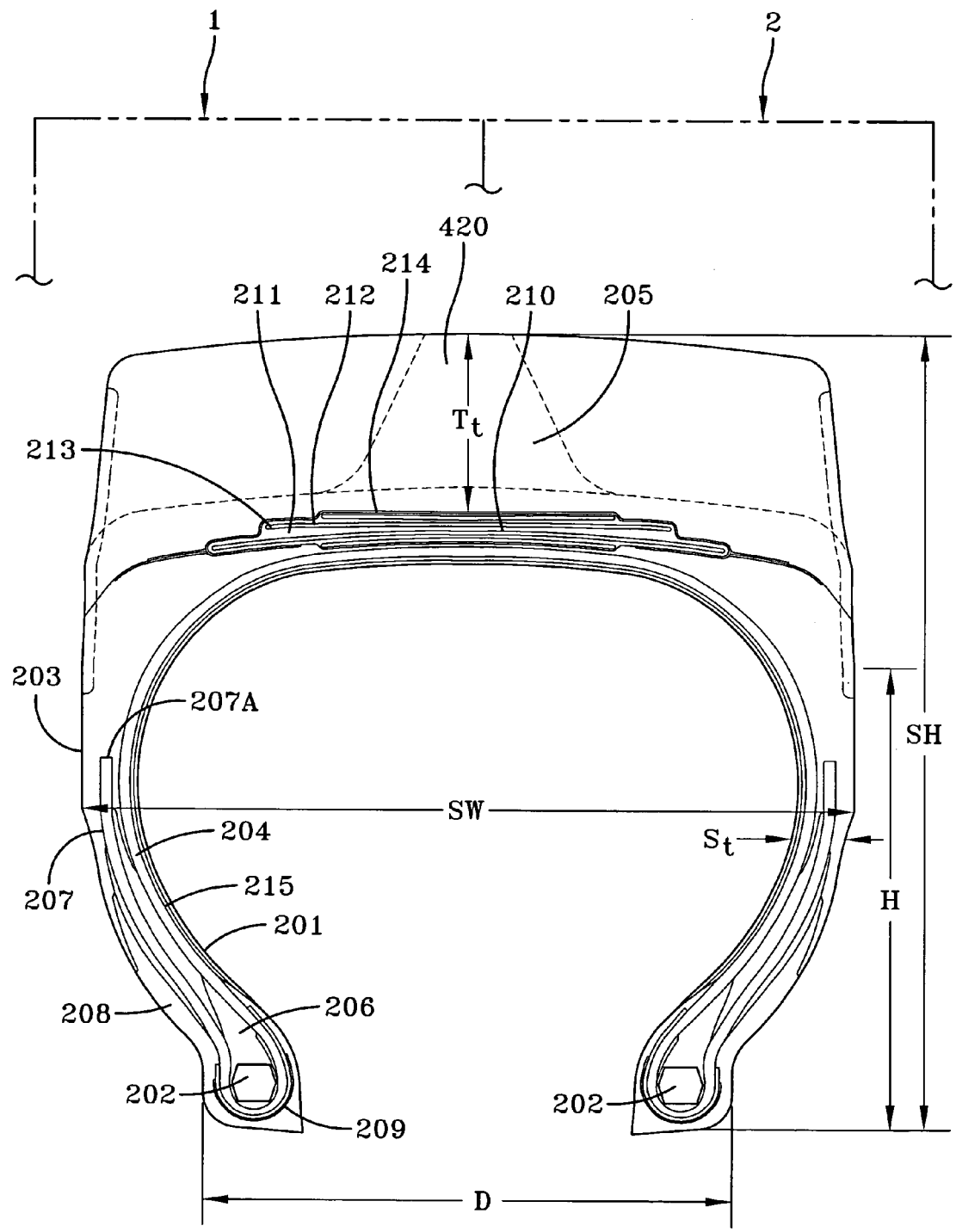
FIG. 6 is a cross sectional view of the prior art tire of FIG. 5.

FIGS. 5 and 6 show a typical prior art underground mine radial tire 200 commonly used in underground mining. These tires 200 employ a carcass 201 having a pair of beads 202 and a steel cord reinforced carcass ply 204 with a reinforcing steel cord reinforced belt structure 210 overlying the carcass crown area, a pair of thick rubber sidewalls 203 having a thickness of typically 0.5 inches or greater and a thick rubber tread layer 205 having thickness Tt of 0.75 inches or more, preferably about 2.0 inches or greater. As shown the tread 205 has a plurality of grooves 400 spacing lugs 410 that extend from the tread edge to a narrow center rib 420. All designed to survive the rigorous underground mine conditions of heavy loads and encounters with sharp, jagged edge debris.

These radial tires 200 are generally preferred over a bias tire because the overall durability of the casing and the tread has been found to be superior to bias tires when the overall objective is maximizing the load carrying capacity of the vehicles.

Each annular bead core 202 has an elastomeric apex 206 radial above and spacing the ply 201 from the ply turnup 207. Axially outward of the ply turnup 207 is a hard rubber chafer 208 and reinforced chipper 209 is wrapped around the ply 207 and ply turnup 207A at the bead area. The sidewall of the carcass 201 and sidewall rubber 203 have an overall minimum sidewall thickness St of approximately 1.25 inches or less occurring at a location near the location maximum section width SW. Similarly the ply turnup 207 has ends 207A at a radial location very close to the maximum section width SW. This is a feature found in off-road tires having high loads generally. Preferably the turnup end 207A lies at a radial location H, H being about midway of the maximum section height SH preferably between 40% and 60% of SH. The radially inner surface of the carcass 201 includes an air impervious liner 215. As shown the belt structure 210 includes four belt layers 211, 212, 213 and 214.

The prior art tire 200, as illustrated in FIGS. 5 and 6, is a RL-5K tire in a 12.00 R 20 sized tire designed to be mounted on a 20 inch nominal rim with a rim width D of 8.50 inches. This tire has an inflated unloaded width of 12.3 inches (312 mm) and overall diameter of 46.6 inches (1184 mm). The loaded dimensions are 13.7 inches (348 mm) loaded section width and 20.8 inches (528 mm) static loaded radius. The static loaded radius measures the height from the center of the axle to the ground under load. This means the 46.6 inch OD of the tire is compressed about 2.5 inches between the rim and the ground under load. This prior art tire 200 has a load carrying capacity of about 12,300 lb (5600 Kg) at 95 psi (660 KPA) and has a maximum inflated load of 15, 200 lb (6895 Kg) at 138 psi (9.5 Bar). If such a tire 200 is further enhanced by foam filling the tires then the maximum load can increase to 16,100 lb (7300 Kg). While these loads are remarkable for a tire mounted on such a small rim, it is the desire of the mine operators to maximize earnings by increasing the amount of ore that can be carried. Accordingly it is an objective to increase the weight carrying capacity of the tire without increasing the overall diameter of the tire.

Figure 2:
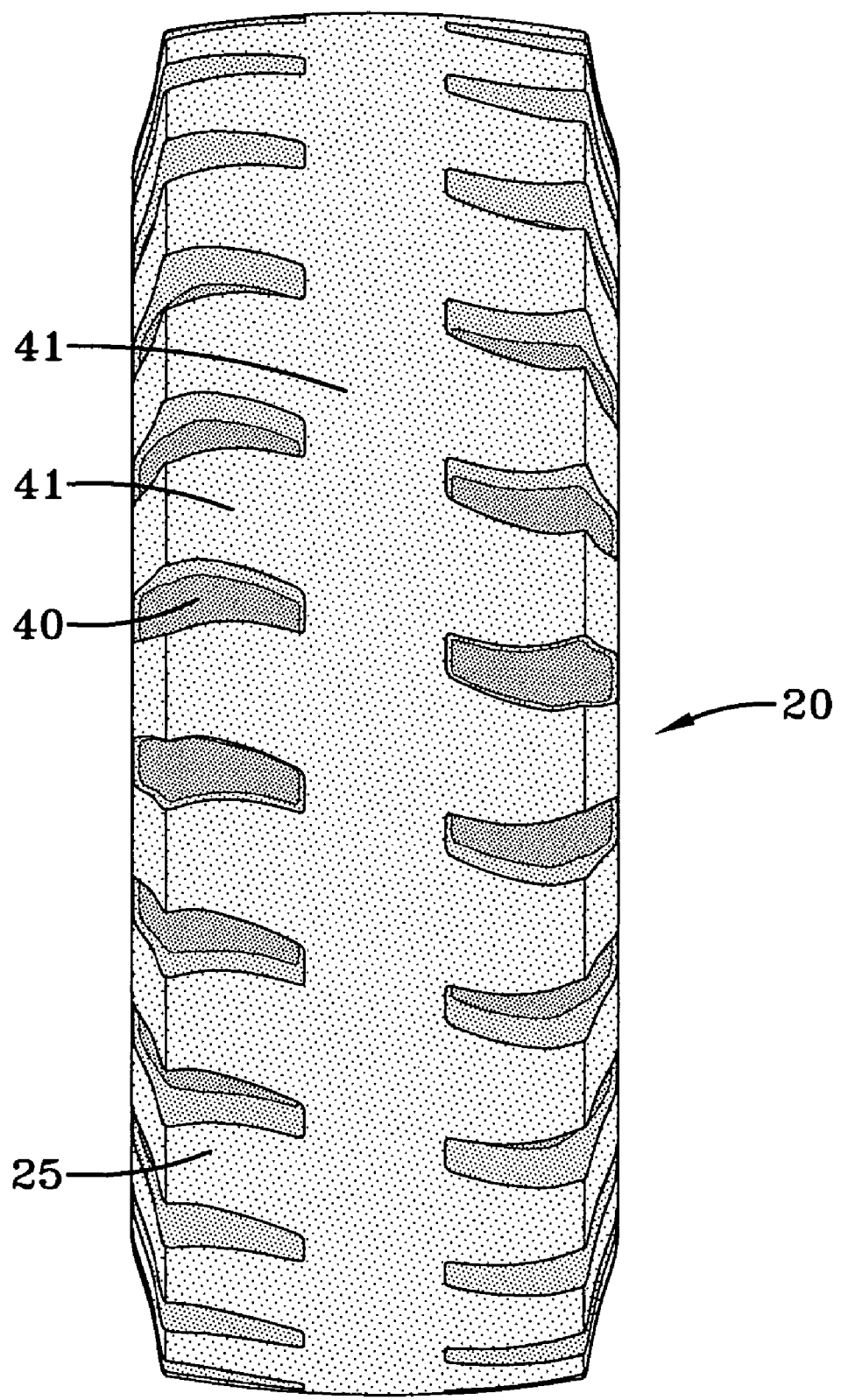
FIG. 2 is a plan view of a tire according to the present invention taken from FIG. 1.
Figure 3:
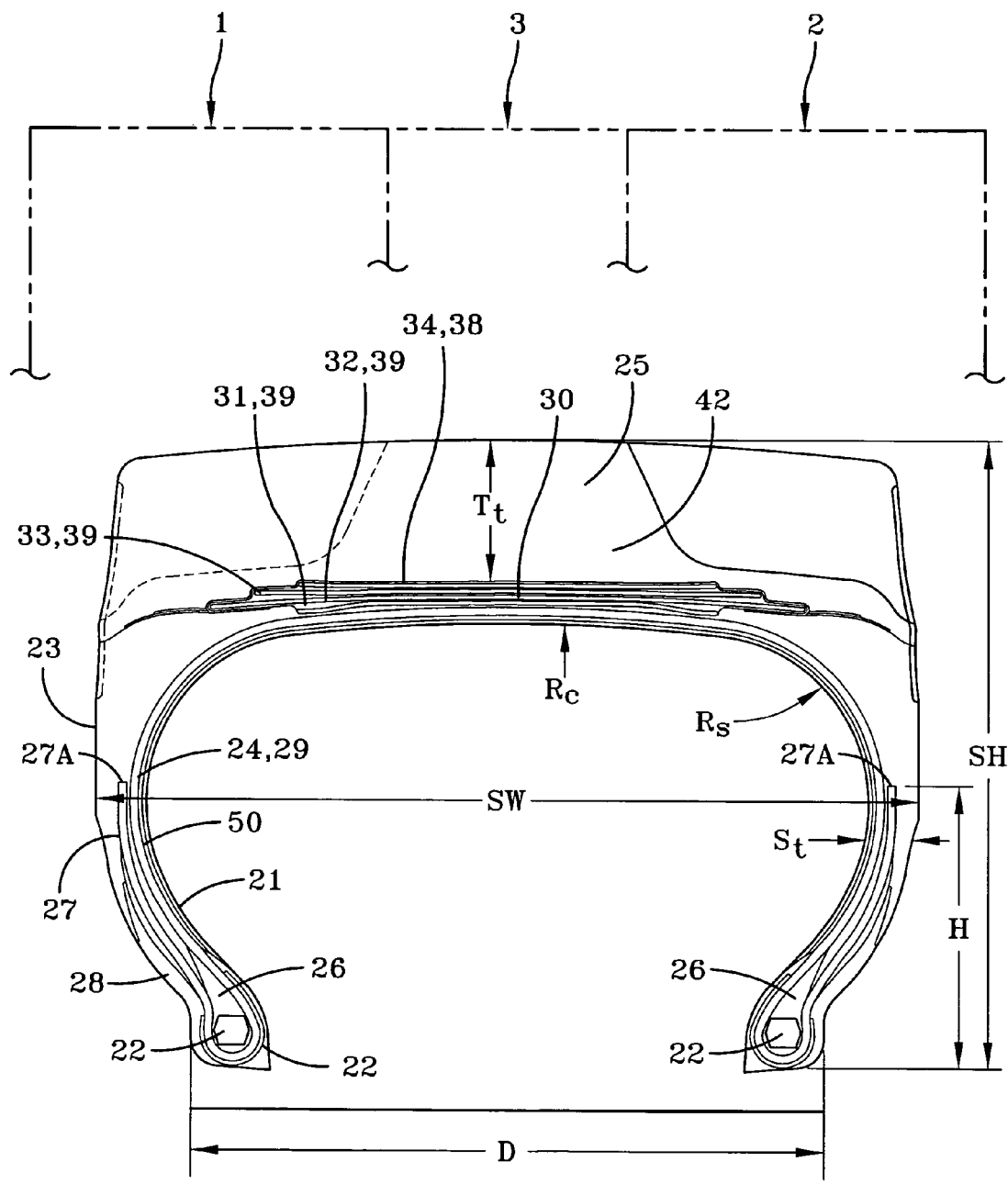
FIG. 3 is a cross sectional view of the tire according to the present invention of FIG. 2.

One way to achieve this desired goal is to widen the tire. The present invention tire 20 when produced as an increased capacity RL-5K tire as illustrated in FIGS. 1-3 has a size designation 46×18 R 20 and has been widened by 4.5 inches when compared to the prior art tire 200. The tire 20 has an overall inflated width of 16.8 inches (427 mm) while maintaining the overall diameter of 46.6 inches (1184 mm). The loaded section width increased to 18.2 inches (462 mm) while the static load radius stayed as 20.8 inches (528 mm). The rated load capacity for this wider tire 20 when mounted on a 20 inch nominal diameter rim with a 13.00 rim width and inflated with air to 95 psi (660 KPA) is 16,100 lb (7300 Kg) at an inflation of 116 psi (8.0 Bar) the tire achieves a load carrying capacity of 17,100 lb (7750 Kg) and if filled with foam the maximum rated load is 26,000 lb (11,794 Kg). A tremendous increase in overall load carrying capacity is achieved.

Table A below shows a side by side comparison of loads and at various inflation pressures.

| Inflated to Psi (KPA) | Prior art tire 200 12.00 R 20 Rated load lb (Kg) | Tire 20 46 × 18 R 20 Rated load lb (Kg) | Load increase |
|---|---|---|---|
| 105 (725) | 12,300 (5600) | 16,100 (7300) | 29% |
| 109 (750) | 12,800 (5800) | 16,500 (7500)* | 30% |
| 112 (775) | 12,800 (5800) | 16,500 (7500) | 30% |
| 116 (800) | 13,200 (6000) | 17,100 (7750) | 30% |
| 120 (825) | 13,600 (6150) | 17,600 (8000) | 29% |
| 123 (850) | 13,900 (6300) | 18,200 (8250) | 31% |
| 127 (875) | 13,900 (6300) | 18,200 (8250) | 31% |
| 131 (900) | 14,300 (6500) | 18,700 (8500) | 31% |
| 134 (925) | 14,800 (6700) | 19,300 (8750) | 30% |
| 138 (950)* | 15,200 (6900)* | 19,800 (9000) | 30% |
| 141 (975) | 15,200 (6900) | 19,800 (9000) | 30% |
| 145 (1000) | 15,700 (7100) | 20,400 (9250) | 30% |
| 149 (1025) | 16,100 (7300) | 20,900 (9500) | 30% |
| 155 (1070) | 16,100 (7300) | 26,000 (11,794) | 61% |
| **With foam | | | |

*max tire load with air
**max tire load foam filled

The average rated load increase over the range of air inflation pressures is 30%. This means that due to the fact that the vehicle weight has not changed all of the increased load carrying capacity can be translated to the increased ore weight carrying capacity. The prior art tire 200 when foam filled achieves a 16,100 lb max load which can be increased in the tire 20 of the present invention by 61% to 26,000 lb.

Alternatively, the tires which were heretofore heavily overloaded by a natural desire to carry more material can now operate well within the design limits and thus each of the inventive tire's usage prior to failure can increase substantially.

The underground mine tires have a limited capacity to accept very high air inflation pressures because they can exceed the design limits of the rim. The preferred way to increase loads is to fill the tires with a foamable elastomeric material. In U.S. Pat. No. 6,623,580 B2 of McMahon et al entitled "Method of Curing Foam Inflated Tires and an Improved Rim" a complete and detailed description of how such mine tires are foam filled. The contents of that patent are incorporated herein by reference in its entirety. The present invention tire 20 has an internal cavity volume of 6.3 cubic ft when made in a 46×18 R 20 size. The prior art tire 200 in a 12.00 R 20 size only has a 4.3 cubic ft volume which is 47% smaller. This greatly increased volume permits much more fill material to be added to the tire and is a big contributor to the increased load carrying capacity.

The present invention tire 20 achieves these tremendous improvements in load carrying capacity by a novel combination of design changes including not only widening the tire while maintaining the overall diameter, but by constructional improvements and variations to the tire's construction.

With reference to FIG. 3, the cross section of an exemplary tire 20 made according to the present invention is shown. The tire 20 has a carcass 21 with a pair of annular bead cores 22, a steel cord reinforced radial carcass ply 24 wrapped around the bead cores 22 and having a ply turnup 27 located between 40% and 60% of the section height SH of the tire. Preferably the turnup end 27A is located near radial location H the maximum section width SW of the tire 20 with 45% and 55% of SH. As shown the steel ply cord 29 has a wire gauge or cord diameter of 0.040 inches and is spaced at 16 ends per inch. An air impermeable inner liner 50 is located radially inward and adjacent the carcass ply 24, wrapped round the ply 24 and ply turnup 27 is a chipper 29. Axially outward of the ply turnup 27 is a hard rubber chafer 28. Radially outward of the carcass 21 is located the belt reinforcing structure 30 of the tire 20. This belt structure 30 has four belt layers progressing radially outwardly the first layer 31; the second layer 32 and the third layer 33 each employ large 0.061 inch cord diameter gauge steel wire cords 39 spaced at eight void ends per inch adjacent layers being oppositely inclined in the range of 20 to 25 degrees. The fourth layer 34 employs a smaller gauge wire cord 38 of 0.036 inch cord diameter spaced at 12 cord ends per inch. This is a departure from the prior art tire of FIGS. 5 and 6 in that both the first layer 211 and fourth belt layer 214 used the smaller wire cord diameter. In the present invention tire 20 the increased width of the tire 20 means the belt structure 30 must be designed to hold or restrict the tires shape under high inflation and loads. Accordingly for such tremendous loads as 26,000 lb when inflated by foam the belt structure 30 must restrict the radial growth of the carcass 21.

Another feature of the present invention is the widening of the tire 20 effectively changes the natural ply line of the carcass ply 24. Ideally abrupt changes of the ply path curvature must be avoided at the transition from the sidewall to the crown. In the present invention the ply path shows a generous substantially constant radius of curvature Rs and a smooth transition to the region radially inward of belts 32 and 33 all the way to just above the bead core. The radius of curvature in the crown area is similarly substantially a constant Rc and smoothly transitions to the smaller radius of curvature Rs in the region at the end of the first belt layer 31 and the point radially inward of the axial end of the third belt layer 33. To achieve this preferred profile the amount of sidewall in the upper region of the tire was increased by about 0.20 inches and the minimum sidewall rubber thickness St increased from 0.68 inches in the tire 200 (12.00 R 20) to 0.88 inches in the tire 20 (46×18 R 20). This effectively allowed the overall curvature to take the more natural ply path.

Radially outward of the belt structure 30 is the tread 25. As illustrated the tread 25 has a plurality of grooves 40 spaced by lugs 41 that extend radially towards the center rib 42 which enhance traction. As shown both the tire 200 and the tire 20 have 24 grooves 400, 40 per tread half. These tires are designed to permit variations between tread halves. The tires could be made with smooth treads or one tread half smooth and the opposite grooved or any number of tread combinations. The groove combination selected depends on the mine conditions. Generally these tires have a net-to-gross ratio of 65% to 100%, most typically 75% to 95%. The total tread thickness as shown is $^{28}/_{32}$ of an inch; typically the treads have a thickness Tt of 0.75 inches to 3.0 inches, more typically 1.50 inches to 2.5 inches.

The present invention tire 20 was built 4.50 inches wider than the prior art tire 200 as a result, the belt structures 30 including each belt layer and the overall carcass ply widths increased similarly. By maintaining the outside diameter constant or fixed at 46 inches meant the aspect ratio of the tire 20 was reduced to 65% from 95%.

An interesting method was developed to fabricate this tire 20. A center ring spacer of a width 4.50 inches having an internal smooth diameter of about 46.00 inches was placed between the tread halves of the mold for producing the prior art tire 200. This created a center rib 42 on the tread 25 that is 4.5 inches wider than the prior art tire 200. The enlarged center rib 42 provides superior contact area directly in the center of the tread 25 without losing any of the grooves 40 for traction. While a simple solution which results is increasing the versatility of the molds the end result was a more durable tread pattern substantially bracing the tread lugs 41 when compared to the tread lugs 410 of the prior art tire 200.

The use of a center ring spacer had been done in bias tire molds, but heretofore was not attempted in a radial tire mold. This use of mold spacers in radial tires was not considered practical in that sensitivity of the ply path was considered critical and therefore each radial had its own mold per tire size. Since mine tires operate at slow speeds and adding rubber to the sidewall shoulders was feasible the ply path curvatures could be maintained at very acceptable loads at the transition near the belt edges. This feature of maintaining the natural ply path to under the belts by the addition of rubber in the sidewalls permitted the tires to be made with very acceptable carcass durability greatly exceeding that of the prior art tire 200 for which the molds were originally made.

The method of adding a center ring spacer to a radial tire mold permits the engineer to vary the width of tires to suit the application's load requirement. In other words the 12.00 R 20 tire could be made in widths less that the 46×18 R 20 tire of the present invention or even wider by selecting the proper spacer and insuring the necessary carcass adjustments are made to maintain a substantially natural ply and proper strength requirement. This ability to adjust the tire size width wise in a radial mine tire can greatly reduce overall mold cost and permit a wider range of products to be produced.

While the tire 20 and tire 200 used a 20 inch nominal bead diameter, smaller diameter tires are being designed in the 15.00 rim diameter size. The present invention of maintaining a tire outside diameter while increasing the overall width is directly applicable to these tires as well.

The present invention tire 20 can be made by the method of increasing the load carrying capacity of a radial tire. The method includes the steps of determining a maximum load, x+y; providing a mold, having two mold halves 12 for a radial tire capable of molding a tire having a rated load x; adding a spacer 3 between adjacent mold halves 1, 2 thereby increasing the axial width of the mold to achieve the desired width of a tire for the rated load x+y; designing an unvulcanized tire 20 having a belt reinforcing structure 30 and a radial ply 24 by increasing the belt width and ply width of the tire 20 and applying sidewall rubber 23 to maintain a ply path curvature; and molding the tire. This method would also include the spacer 3 having a smooth internal surface for forming a continuous tread rib 42, as well as the step of increasing the reinforcing strength of the tire structure by changing one or more of the strengths of bead wires 22, the ply wires 29 or the belt wire cords 39.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An underground mine tire having a nominal bead diameter of 20.0 inches or less comprises:

a carcass having at least one radial steel cord reinforced ply;

a belt reinforcing structure having four belt layers, a radially inner first layer, a second layer, a third layer and a radially outer fourth layer, wherein the first, second and third layers have steel cords having cord diameters of 0.06 inch or greater, the steel cords being spaced at 8 ends per inch or less and the radially outer fourth layer has steel cords having a cord diameter of 0.04 inch or less, the steel cords being spaced at 12 ends per inch or more;

a tread;

a pair of rubber sidewalls extending along the carcass below the tread, and wherein the tire has a nominal bead width greater than 8.50 inches and an overall diameter of less than 55 inches.

2. The underground mine tire of claim 1, wherein the tread has a plurality of grooves on each tread half terminating at a central rib, the central rib being 2.0 inches in width or more.

3. The underground mine tire of claim 1, wherein the tread has a plurality of grooves on each tread half terminating at a central rib, the central rib being 4.5 inches in width or more.

4. An underground mine tire having a nominal bead diameter of 20.0 inches or less comprises:

a carcass having at least one radial steel cord reinforced ply;

a tread;

a pair of rubber sidewalls extending along the carcass below the tread, and wherein the tire is a 46×18 R20 size and has a nominal bead width greater than 8.50 inches and an overall diameter of less than 55 inches.

5. The underground mine tire of claim 4, further comprises a nominal bead width of D, D being greater than 8.5 inches.

6. The underground mine tire of claim 4, wherein the tire is filled with foam.

7. The underground mine tire of claim 4, has a nominal bead width of 13.00 inches.

8. The underground mine tire of claim 4, wherein the tread has a plurality of grooves on each tread half terminating at a central rib, the central rib being 2.0 inches in width or more.

9. The underground mine tire of claim 4, wherein the tread has a plurality of grooves on each tread half terminating at a central rib, the central rib being 4.5 inches in width or more.

10. An underground mine tire having a nominal bead diameter of 20.0 inches or less comprises:

a pair of annular bead cores;

a steel cord reinforced radial carcass ply wrapped around the bead cores having a ply turnup end located between 40% and 60% of the section height of the tire;

a belt reinforcing structure having a radially inner first belt layer, a second belt layer, a third belt layer and a radially outer fourth layer;

a tread;

a pair of rubber sidewalls, each rubber sidewall extending from a bead to the tread along the outer periphery of the carcass ply and having a minimum thickness of 0.5 inches, wherein the first, second and third layers have steel cords having a cord diameter of 0.06 inch or greater, the steel cords being spaced at 8 ends per inch or less and the radially outer fourth layer has steel cords having a cord diameter of 0.04 inch or less, the steel cords being spaced at 12 ends per inch or more.

11. The underground mine tire of claim 10, wherein the bead cores have a cross sectional area of 0.36 square inches or greater.

12. The underground mine tire of claim 11, wherein the bead core has a wire strand diameter of 0.072 inches wrapped 64 times for a hexagonal bead shape.

13. The underground mine tire of claim 10, further comprises a nominal bead width of D, D being greater than 8.5 inches.

14. The underground mine tire of claim 13, wherein the tire has an outside diameter of less than 55.00 inches.

15. The underground mine tire of claim 14, wherein the tire is of a size 46×18 R 20.

16. The underground mine tire of claim 15, wherein the tire is filled with foam.

17. The underground mine tire of claim 16, has a nominal bead width of 13.00 inches.

* * * * *